United States Patent
Budmen

(10) Patent No.: US 10,562,228 B2
(45) Date of Patent: Feb. 18, 2020

(54) THREE-DIMENSIONAL (3D) PRINTER

(71) Applicant: Isaac Budmen, Philadelphia, PA (US)

(72) Inventor: Isaac Budmen, Philadelphia, PA (US)

(*) Notice: Subject to any disclaimer, the term of this patent is extended or adjusted under 35 U.S.C. 154(b) by 37 days.

(21) Appl. No.: 15/962,591

(22) Filed: Apr. 25, 2018

(65) Prior Publication Data
US 2018/0311895 A1 Nov. 1, 2018

Related U.S. Application Data

(60) Provisional application No. 62/490,187, filed on Apr. 26, 2017.

(51) Int. Cl.
| | |
|---|---|
| *B29C 64/20* | (2017.01) |
| *B29C 64/227* | (2017.01) |
| *B33Y 30/00* | (2015.01) |
| *B29C 64/245* | (2017.01) |
| *B22F 3/00* | (2006.01) |
| *A23P 20/20* | (2016.01) |
| *B28B 1/00* | (2006.01) |
| *A23P 30/20* | (2016.01) |
| *B29C 64/209* | (2017.01) |
| *A23P 20/25* | (2016.01) |
| *B33Y 70/00* | (2020.01) |
| *B22F 3/105* | (2006.01) |

(52) U.S. Cl.
CPC ............ *B29C 64/227* (2017.08); *A23P 20/20* (2016.08); *A23P 30/20* (2016.08); *B22F 3/008* (2013.01); *B28B 1/001* (2013.01); *B29C 64/20* (2017.08); *B29C 64/245* (2017.08); *B33Y 30/00* (2014.12); *A23P 2020/253* (2016.08); *B22F 3/1055* (2013.01); *B22F 2003/1056* (2013.01); *B29C 64/209* (2017.08); *B33Y 70/00* (2014.12)

(58) Field of Classification Search
CPC ...... B29C 64/118; B29C 64/20; B29C 64/245
See application file for complete search history.

(56) References Cited

U.S. PATENT DOCUMENTS

2016/0144569 A1  5/2016  Martin

OTHER PUBLICATIONS https://www.kickstarter.com/projects/1333614982/focus-the-first-multi-material-portable-3d-printer/ (Year: 2015).*
https://www.youtube.com/watch?v=JB6L_A9REIg (Year: 2013).*

* cited by examiner

*Primary Examiner* — Timothy Kennedy
(74) *Attorney, Agent, or Firm* — Howson & Howson LLP

(57) ABSTRACT

A 3D printer includes a build plate, a carriage movable alongside edges of the build plate between a front and rear of the build plate, and an arch connected to the carriage and movable therewith. The arch includes a pair of legs and an upper cross bar. A cross support is connected to the arch and extends between the legs and is movable between opposite ends of the legs. A tool head is connected to the cross support and is moveable along the cross support from one of the legs to the other. The interconnection of the legs to the carriage permits the arch to pivot between a printer operational condition in which the legs of the arch extend upright relative to the build plate and a collapsed condition in which the legs of the arch extend along the side edges of the build plate.

8 Claims, 6 Drawing Sheets

THREE-DIMENSIONAL (3D) PRINTER

CROSS REFERENCE TO RELATED APPLICATIONS

This application claims the benefit under 35 USC § 119(e) of U.S. Provisional Patent Application No. 62/490,187, filed Apr. 26, 2017.

BACKGROUND

The present invention relates to a three-dimensional (3D) printer, and more particularly, a 3D printer capable of being collapsed into a compact portable state for ready travel and/or storage.

Three-dimensional (3D) printing is a form of additive manufacturing in which 3D objects may be printed or produced by building up successive layers of material which are either fused, adhered, or hardened together. Typical 3D printers are constructed of a structure having rigid beams or rods that extend the entire height, length, and width (x, y, and z axis) of the printable area. A tool head travels up, down, side-to-side, front-to-back, and/or back-to-front along the rods or, alternatively, the build platform or printing surface may be able to travel up or down vertical rods or beams. These configurations allow the object to be built layer-by-layer moving the tool head along the vertical and horizontal axis.

For purposes of example, a relatively-large 3D printer may provide a printable area of one cubic meter (i.e., 1,000 mm by 1,000 mm by 1,000 mm). Such a relatively large 3D printer has limited mobility due to its large size and weight and is typically difficult to transport from one site to another.

SUMMARY

According to an embodiment, a three dimensional (3D) printer is provided. The 3D printer includes a build plate having a front, a rear, opposite side edges, and an upper surface providing a platform for supporting printed material. In addition, the 3D printer includes at least one carriage movable along the side edges of the build plate between the front and rear of the build plate and an arch connected to the at least one carriage and movable therewith such that the arch can be positioned anywhere over the build plate from the front of the build plate to the rear of the build plate. The arch may include a pair of legs and an upper cross bar. A cross support is connected to the arch and extends between the legs and is movable between opposite ends of each of the legs such that the cross support may be positioned at a predetermined height above the build plate. A tool head is connected to the cross support and is moveable along the cross support from one of the legs to the other of the legs such that the tool head may be positioned at any lateral position relative to a center of the build plate. The interconnection of the legs to at least one carriage permits the arch to pivot between the printer's operational condition in which the legs of the arch extend upright relative to the build plate and a collapsed condition in which the legs of the arch extend adjacent and along the side edges of the build plate.

BRIEF DESCRIPTION OF THE DRAWINGS

The foregoing and other objects, features and advantages of the embodiments disclosed herein should become apparent from the following description when taken in conjunction with the accompanying drawings.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

A computer or like electronic device controls the movement and deposition of a material via a tool head or print head provided on a support of a 3D printer. The material is typically a fluent or malleable material such as a liquid plastic, paste, hot glue, or the like extruded through a nozzle on the tool head. Other examples of materials may include concrete (concrete like materials), chocolate (or other food products), rubber, elastomeric materials, nylon, electrically conductive resins, metals, and epoxy-like (resin hardeners) materials as well as other materials.

The material used to form 3D objects may be heated and extruded or printed onto a build plate or like platform or support surface. The movement of the tool head may be controlled, for instance, by a series of actuators, servomotors, or other movement mechanisms to allow for control in two or more dimensions by the computer. The deposited material layers then cool and harden into the desired 3D shape or form.

Typically, computer aided design (CAD) files or the like which provide digitalized representations of an object, are translated into a language or file type a 3D printer understands for purposes of adding one layer of material on top of another to form a 3D object. Accordingly, the tool head is properly positioned, material is extruded, the tool head is repositioned, further material is extruded, and so forth until a printed 3D object is built up and formed.

Figure 1:
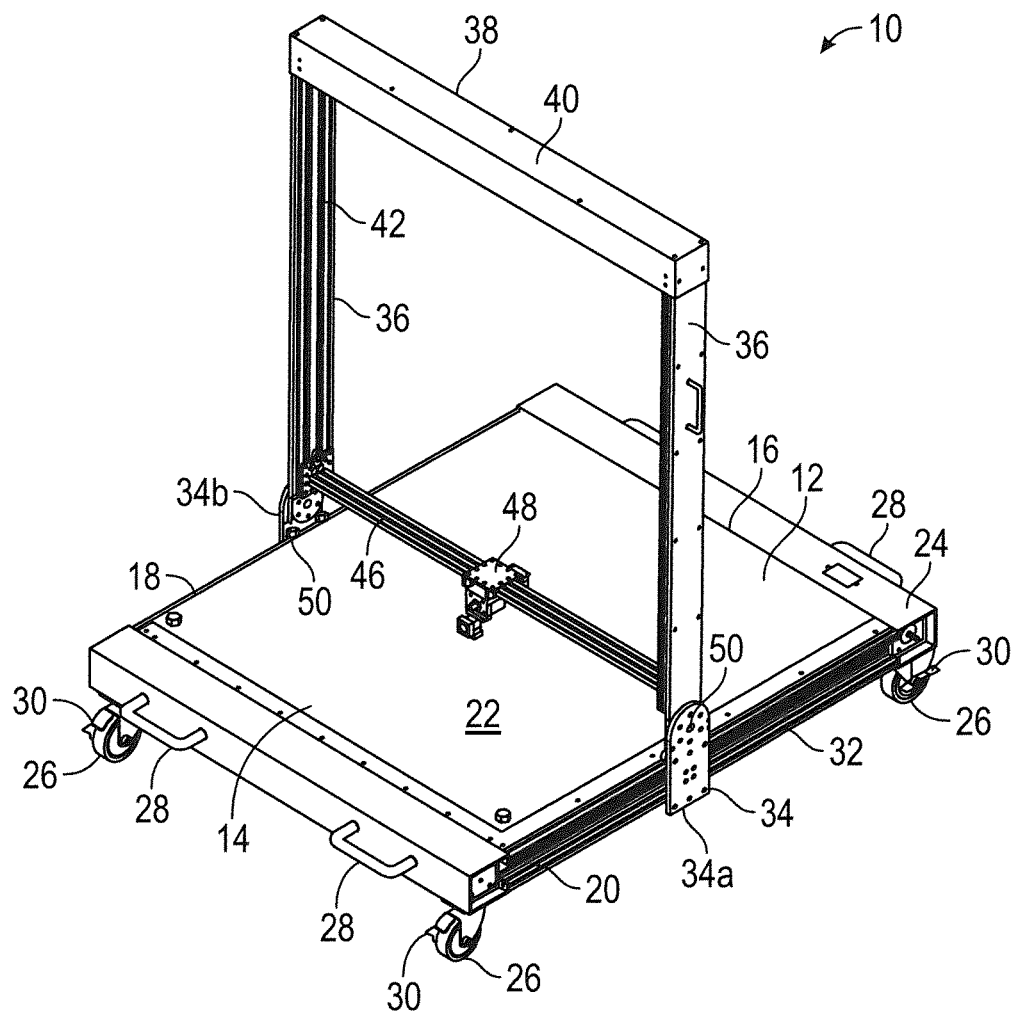
FIG. 1 is a perspective view of a 3D printer according to an embodiment.
Figure 2:
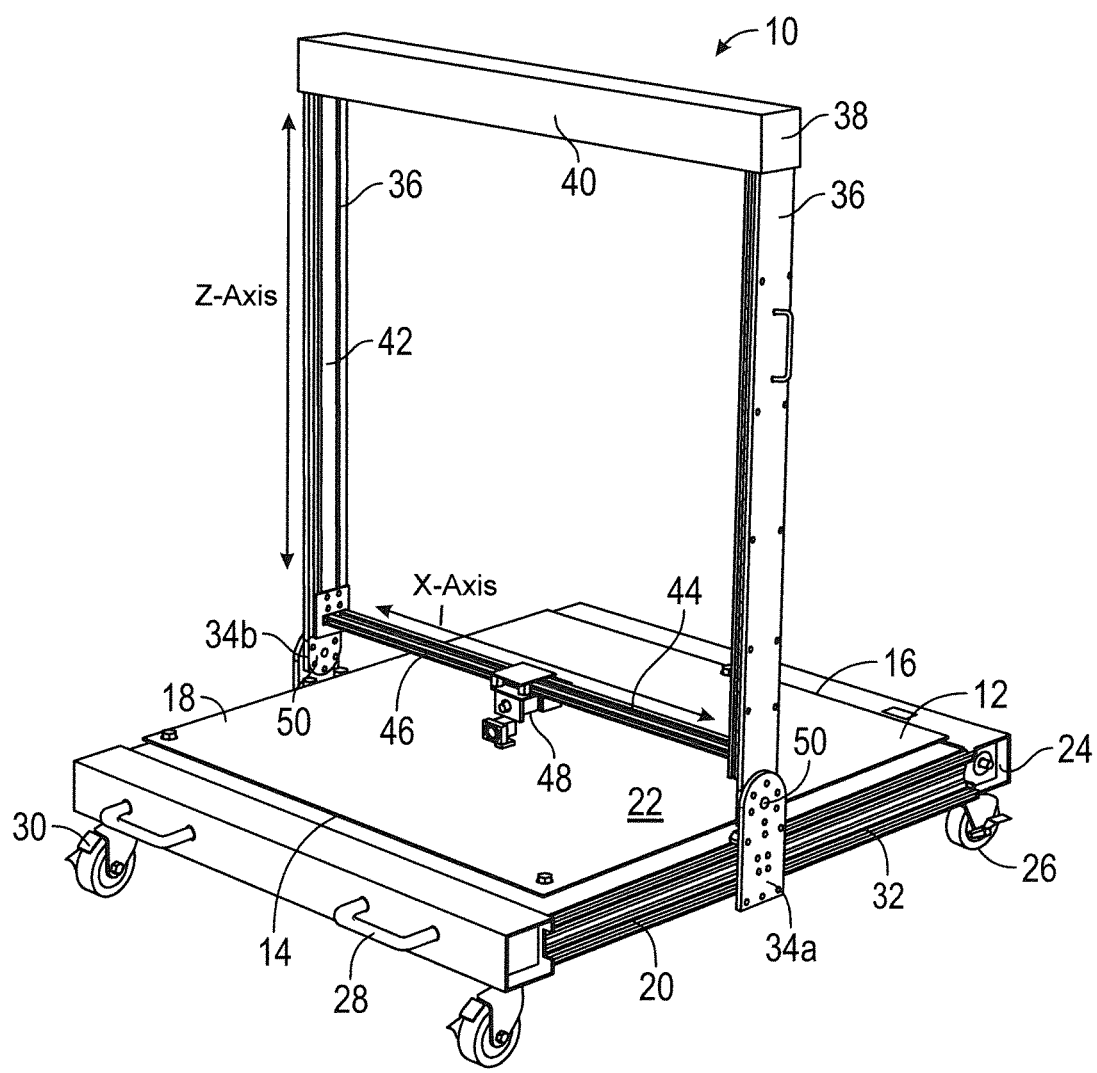
FIG. 2 is a perspective view of a 3D printer according to an embodiment.

FIGS. 1 and 2 show an embodiment of a 3D printer 10 which may be operated as discussed above. In addition, the 3D printer 10 provides a portable structure that is capable of being folded into a relatively-compact travel state allowing ready storage and/or transport from site to site. According to an embodiment, the portability is accomplished using a folding arch or support structure and an integrated structural linear motion system.

The 3D printer 10 has a build plate 12 providing a platform on which a 3D object may be formed or "printed". Accordingly, the build plate 12 may have a front or leading edge 14, a rear or rear edge 16, opposite side edges 18 and 20, and an upper surface 22 providing a platform for supporting printed material. The build plate 12 may be secured to an underlying base frame 24 or like structure which may be supported from an underlying surface via wheels 26, casters, or the like to permit ready movement of the 3D printer 10. The base frame 24 may be provided with a set of handles 28 adjacent the front 14 and/or rear 16 of the build plate 12, and the wheels 26 may include brakes 30 for maintaining the 3D printer 10 in a stationary position during use. In an alternative embodiment, the 3D printer may be provided without wheels or handles.

For purposes of example, the 3D printer 10 may be provided such that it has a relatively large print area (for instance, at least 1,000 mm by 1,000 mm by 1,000 mm or other relatively large size). Of course, the 3D printer may also be provided in smaller sizes such as to provide a print area that is less than 1,000 mm by 1,000 mm by 1,000 mm.

The base frame 24 includes side rails or tracks 32 extending adjacent both sides of the build plate 12. Each of the side rails or tracks 32 extends from the front 14 to the rear 16 of the build plate 12 and parallel to each other. At least one carriage 34 is secured to a side rail or track 32. According to the illustrated embodiment, the 3D printer 10 incudes a first and second carriage, 34a and 34b, with one mounted on each of the opposite sides of the build plate 12. Each of the carriages, 34a and 34b, is configured for linear movement along the side rails or tracks 32 between the front 14 of the build plate 12 and the rear 16 of the build plate 12, and each of the carriages, 34a and 34b, support a leg 36 of a support arch 38. Each of the carriages, 34a and 34b, move in concert from the front to the rear or from the rear to the front of the build plate 12.

In an operational state of the 3D printer 10, the support arch 38 is positioned in an upright or vertical condition (i.e., legs 36 are oriented in a vertical position extending above the build plate 12). The arch 38 is configured from the pair of legs 36 and an upper cross bar 40 that extends from the top or free end of one of the legs 30 to the other remote from the carriages, 34a and 34b. Each of the legs 36 includes a rail or track 42 along which a cross support 44 is attached. The cross support 44 also includes a rail or track 46 to which a tool head, print head, extruder, or nozzle 48 is attached.

The tool head 48 is adapted for movement along the cross support 44 from side-to-side of the build plate 12. This direction defines movement of the tool head 48 along an x-axis of a build area defined by the 3D printer 10. The carriages, 34a and 34b, are configured for joint movement in concert for purposes of moving the arch 38, and thus, the tool head 48, in a direction from the front 14 to the rear 16 of the build plate 12 and from the rear 16 to the front 14 of the build plate 12. This direction defines movement of the tool head 42 along a y-axis of the build area defined by the 3D printer 10. The cross support 44 is adapted for movement up and down a height of the legs 36. This direction defines movement of the tool head 42 along a z-axis of the build area defined by the 3D printer 10. Accordingly, by controlling movement of the tool head 48 on the cross support 44, movement of the carriages, 34a and 34b, on the rails or tracks 32 of the base frame 24, and movement of the cross support up and down the rails or tracks 42 of the legs 36, the tool head 48 can be positioned anywhere within the print or build area defined on the build plate 12.

For example, material may be extruded from the tool head 48 on the build plate 12 in any pattern defined to ultimately form a base layer of an object on the build plate 12 by appropriate positioning of the tool head 48 and extrusion of material. Thereafter, an additional layer may be formed thereon by raising and moving the tool head 42 upward from the build plate 12. Additional layers may be formed, one by one, until the 3D object is complete. The size of the 3D object formed is limited by the build area of the 3D printer.

Figure 3A:
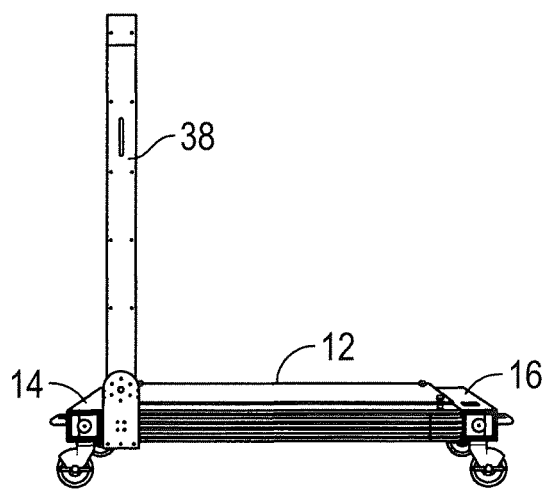
FIGS. 3A-3E are side elevational views of the 3D printer of FIG. 2 showing longitudinal movement of a support arch from a front to a rear of the 3D printer.
Figure 3B:
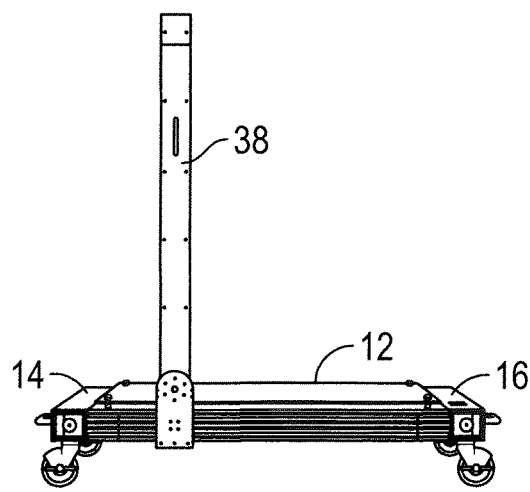
Figure 3C:
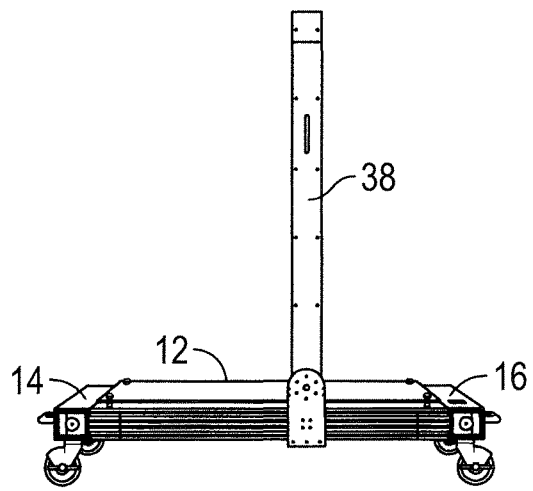
Figure 3D:
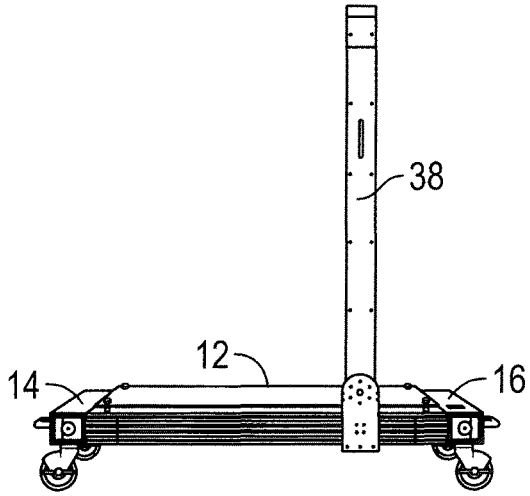
Figure 3E:
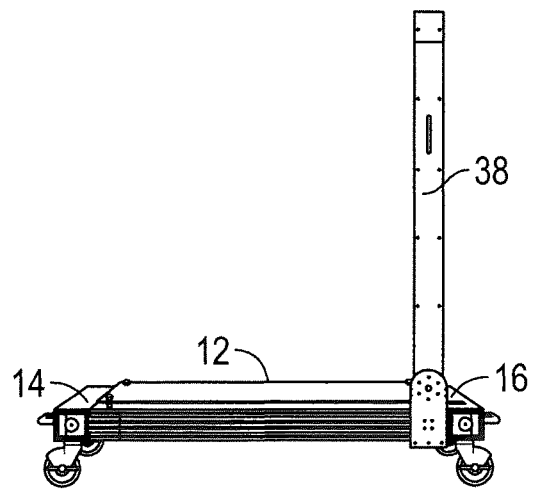

FIGS. 3A-3E show a series of movements of the arch 38 from the front 14 of the build plate 12 (FIG. 3A) to the rear 16 of the build plate 12 (FIG. 3E). FIGS. 3B-3D show intermediate positions of the arch 38 between the front 14 and rear 16 of the build plate 12. For instance, FIG. 3C shows the arch 38 in a center position relative to the front 14 and rear 16 of the build plate 12.

Figure 4A:
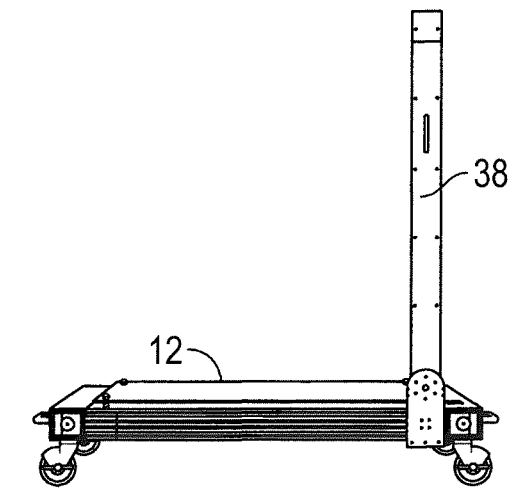
FIGS. 4A-4G are side elevational views of the 3D printer of FIG. 2 showing the support arch folded from an operational upright position to a folded horizontal position and returned to the operational upright position.
Figure 4B:
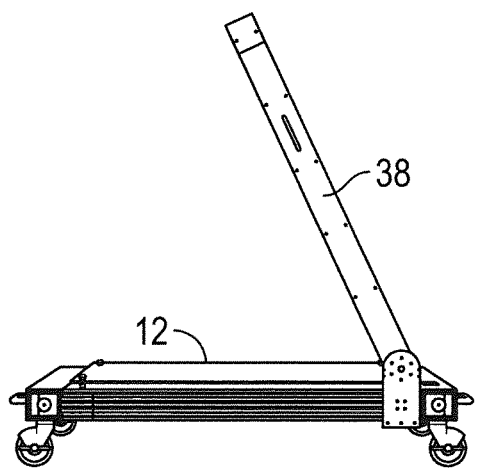
Figure 4C:
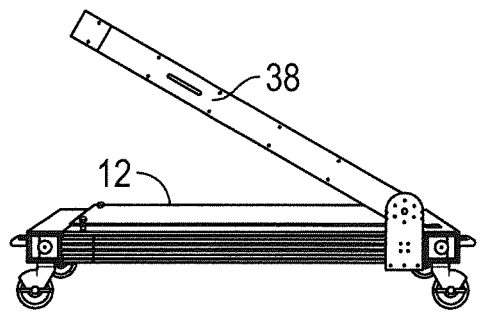
Figure 4D:
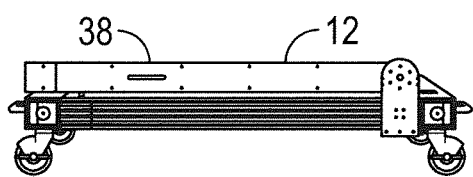
Figure 4E:
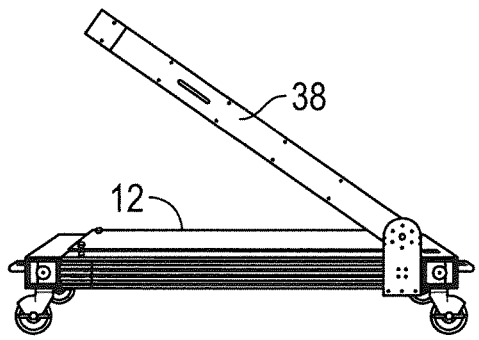
Figure 4F:
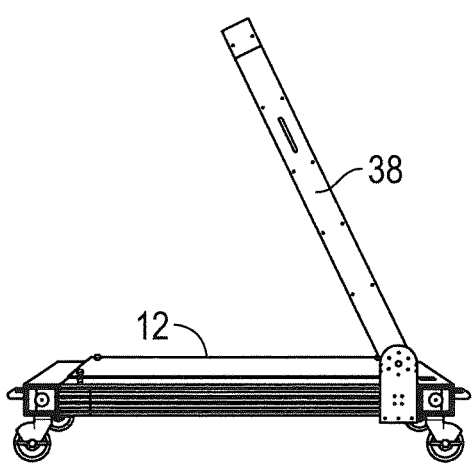
Figure 4G:
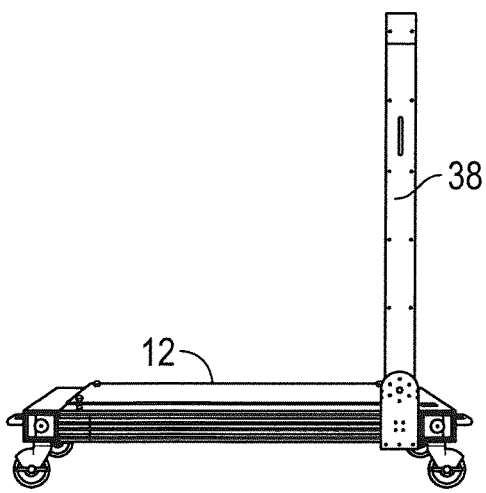

For purposes of enabling the arch 38 to be placed in a collapsed position relative to the build plate 12 so that the 3D printer 10 may be placed in a compact condition for storage or ready transport, the legs 36 are interconnected to the carriages, 34a and 34b, in a manner forming hinges 50 thereby permitting the arch 38 to be pivoted or folded relative to the base frame 24 and build plate 12. For example, FIG. 4A shows the arch 38 in the standard upright position required for operation of the 3D-printer 10. However, as best shown in FIGS. 4B and 4C, the arch 38 may be pivoted or folded along the hinges 50 to swing the arch 38 from the upright condition to a horizontal position as shown in FIG. 4D. In the fully folded position (FIG. 4D), the arch 38, including the legs 36 and upper cross bar 40 rest on the base frame 24 in a horizontal position (see FIG. 6) extending adjacent the side edges, 18 and 20, and front 14 of the build plate 12. According to an embodiment, the cross support 44 is raised to an uppermost position on the legs 36 when the arch 38 is folded. Thus, the cross support 44 may be received and protected within the upper cross bar 40 in the storage position. FIGS. 4E and 4F show the arch 38 being returned to the upright operation position shown in FIG. 4G.

Figure 5:
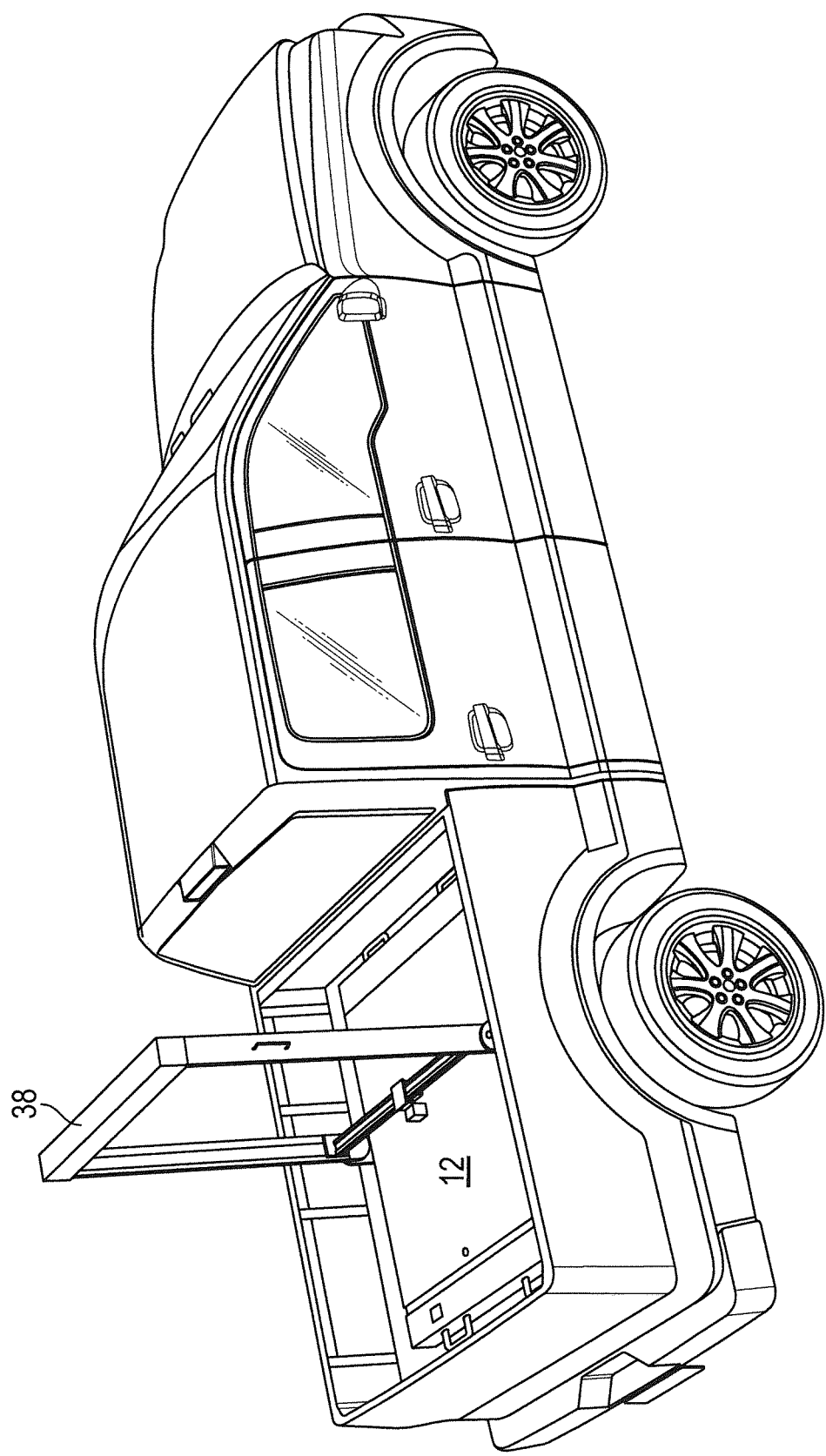
FIG. 5 is a perspective view of the 3D printer of FIG. 2 located in the storage bed of a pickup truck.
Figure 6:
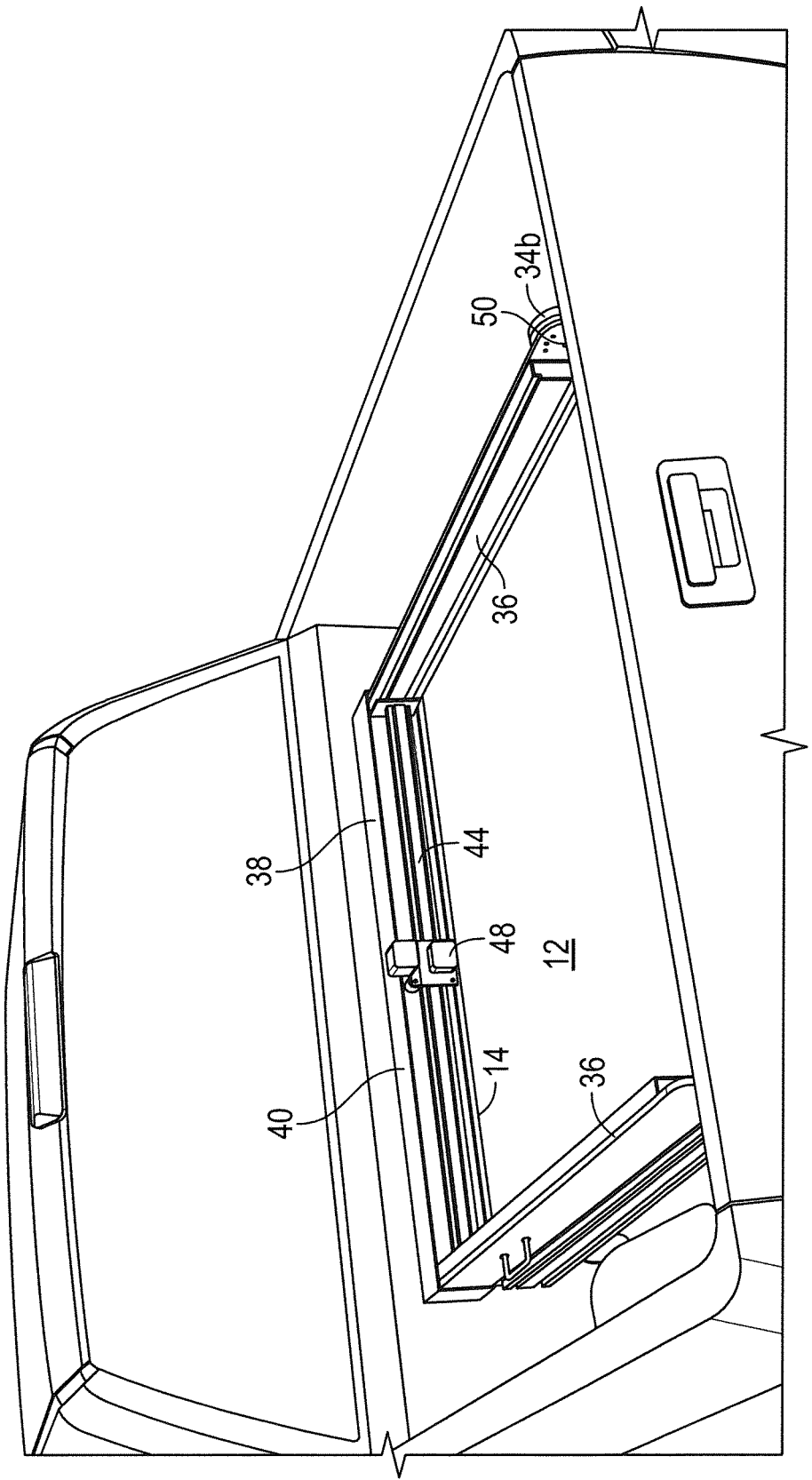
FIG. 6 is a perspective view of the 3D printer and pickup truck of FIG. 5 with the 3D printer in a compact state for ready travel.

As shown in FIG. 5, the 3D printer 10, despite its large build area (for instance, at least 1,000 mm by 1,000 mm by 1,000 mm) may be transported in the bed of a pickup truck (or within the back of an SUV). However, instead of the position shown in FIG. 5 (in which the arch 38 is shown in an upright operation position), the arch 38 may be folded as shown in FIG. 6 for ready and safe transport and or storage in a compact condition and then readily returned to an operational position.

Accordingly, having moved the 3D printer to a desired destination, the arch 38 may be folded or pivoted upward to the upright position, the tool head 48 may be connected to a supply of fluent material for forming a 3D object, the 3D printer may be placed in communication with a computer or like electronic device (by wire or wireless connection) for controlling movement of the carriages 34a and 34b, cross support 44, and tool head 48 along each of the x, y and z axis.

The various components described above, such as the arch, cross support, base frame, build plate and tool head may be made of metallic or non-metallic materials, resins, composite materials, or the like.

The above description illustrates an embodiment of how aspects of the present invention may be implemented, and are presented to illustrate the flexibility and advantages of particular embodiments as defined by the following claims, and should not be deemed to be the only embodiment. One of ordinary skill in the art will appreciate that based on the above disclosure and the following claims, other arrangements, embodiments, implementations and equivalents may be employed without departing from the scope hereof as defined by the claims.

Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A three dimensional (3D) printer, comprising:
a build plate having a front, a rear, opposite side edges, and an upper surface providing a platform for supporting printed material, said build plate being mounted on a base frame having rails extending along and adjacent each of said side edges of said build plate;
a first carriage and a second carriage movable along said side edges of said build plate between said front and rear of said build plate, said first carriage being mounted on said rails of said base frame extending along one of said side edges of said build plate and said second carriage being mounted on said rails of said base frame extending along an opposite one of said side edges of said build plate;
an arch connected to said first and second carriages and movable therewith, said arch including a pair of legs and an upper cross bar, one of said legs of said arch being connected to said first carriage and an opposite one of said legs of said arch being connected to said second carriage;
a cross support connected to said arch and extending between said legs and being movable between opposite ends of each of said legs; and
a tool head connected to said cross support and being moveable along said cross support from one of said legs to the other of said legs, said tool head including a nozzle for extruding printable material;
wherein an interconnection of said legs to said first and second carriages permits said arch to pivot between a printer operational condition in which said legs of said arch extend upright relative to said build plate and a collapsed condition in which said legs of said arch extend along said side edges of said build plate;
wherein said interconnection of legs of said arch to said first and second carriages is via hinges permitting said arch to pivot relative to said carriages;
wherein, in said collapsed condition of said arch, said legs of said arch rest on said base frame and extend substantially parallel to said side edges of said build plate;
wherein each of said legs of said arch include rails, wherein said cross support interconnects to each of said rails of said legs, and wherein, when said arch is in said printer operational condition, said cross support is movable along said rails of said legs from adjacent said build plate to an elevation above and spaced from said upper surface of said build plate; and
wherein said cross support includes a rail and wherein said tool head interconnects to said rail of said cross support and is moveable along said rail of said cross support.

2. The three dimensional (3D) printer according to claim 1, wherein said tool head is connected to a supply of printable material.

3. The three dimensional (3D) printer according to claim 2, wherein the printable material is selected from the group consisting of liquid plastic, paste, hot glue, concrete, food product, chocolate, rubber, elastomeric material, nylon, electrically conductive resin, metal, and epoxy resin.

4. The three dimensional (3D) printer according to claim 1, wherein movement of said first and second carriages relative to said side edges of said build plate, movement of said cross support along the legs of said arch, and movement of said tool head along said cross support is computer controlled to position said tool head at desired positions relative to said build plate.

5. The three dimensional (3D) printer according to claim 1, wherein each of said front and rear of said base frame includes a least one handle.

6. The three dimensional (3D) printer according to claim 5, wherein said base frame includes a set of wheels for supporting said base frame on an underlying surface.

7. The three dimensional (3D) printer according to claim 1, wherein at least one of a height, length and width of a printable area provided by the printer on the build plate is at least 1,000 mm (39.4 inches).

8. The three dimensional (3D) printer according to claim 1, wherein said hinges permit said arch to pivot in a forward direction toward said front of said build plate and in an opposite direction toward said rear of said build plate.

* * * * *